Patented Oct. 28, 1930

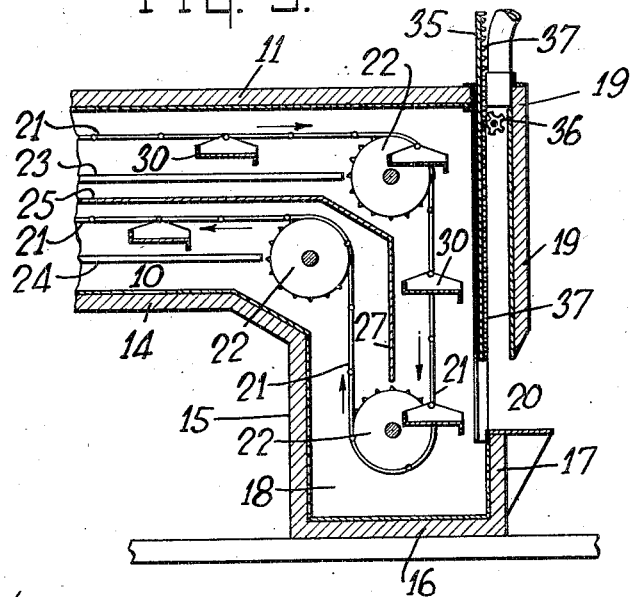
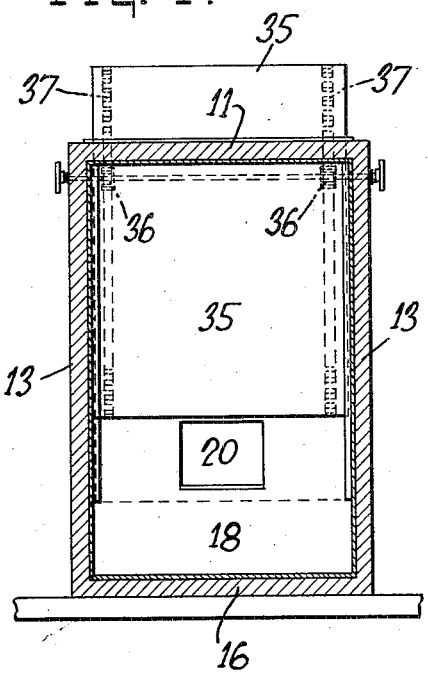
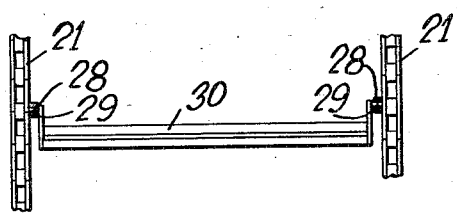

1,779,962

UNITED STATES PATENT OFFICE

ROBERT L. CORBY AND GABE R. FENNEMA, OF NEW YORK, N. Y.

BAKING OVEN

Application filed January 28, 1930. Serial No. 423,924.

This invention relates to bakers' ovens of the traveling type, and more particularly to bakers' ovens of the type employing an endless conveyor onto which the dough units may be continuously loaded and from which the baked loaves may be removed after passage through a baking zone.

A general object of the invention is to provide an oven which is simply and economically constructed and which will operate with freedom from mechanical troubles and give improved baking efficiency and larger production per unit of space occupied.

A more particular object of the invention is to provide an oven so constructed that the baking conditions therein, or in different zones thereof, may be readily varied in accordance with the nature of the dough-stuff being baked, and with the results desired, without substantially disturbing the constant uniform temperature of the oven or the static condition of the gases.

A further object is to provide an oven of the traveling-chain type, in which the loading and unloading may be accomplished from one opening, said opening and associated parts being so positioned and constructed as to give maximum protection to the operator from radiated heat.

Other objects of the invention will in part be obvious and will in part appear hereinafter.

The invention accordingly comprises the features of construction, combination of elements and arrangement of parts which will be exemplified in the construction hereinafter set forth, and the scope of the application of which will be indicated in the claims.

For a fuller understanding of the nature and objects of the invention reference should be had to the following detailed description taken in connection with the accompanying drawings, in which:

Fig. 3 is a view similar to the right-hand end of Fig. 1, showing a modified form of baffle-plate construction;

Fig. 4 is a detail view similar to Fig. 2, showing the modified form of Fig. 4; and Fig. 5 is a detail view of a portion of a chain conveyor and associated tray which may be conveniently used.

Figure 1:
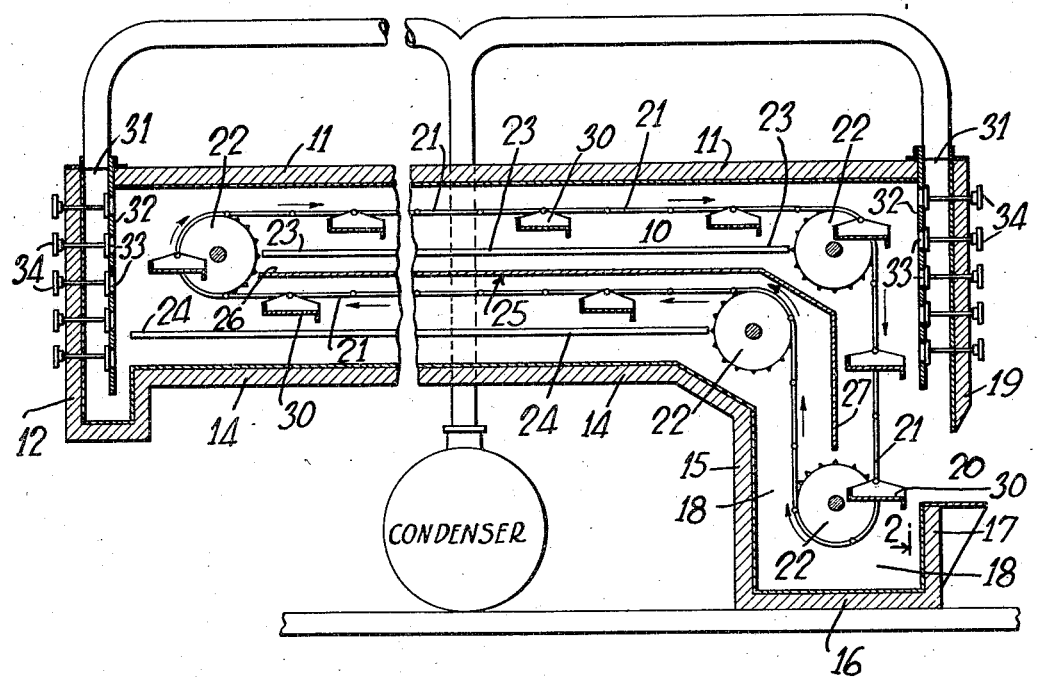
Fig. 1 is a vertical longitudinal sectional view, partly broken away, of an oven shell showing one embodiment of the invention.

Referring more particularly to the drawings, in the embodiment shown in Fig. 1, there is provided an oven chamber 10 formed by a top wall 11, a rear end wall 12, side walls 13, and a bottom wall 14. The top wall 11 is somewhat longer than the parallel portion of the bottom wall 14, and the latter is formed with a downwardly-projecting portion 15, a horizontal portion 16, and an upwardly-projecting portion 17 to provide a depending leg 18 comprising an extension of the horizontal oven chamber 10, and forming therewith an inverted h-shaped chamber.

At the front of the oven chamber 10, and preferably slightly spaced from the top wall 11 of the oven shell, is positioned a front wall 19 which projects downwardly toward the upwardly-extending projection 17, an opening 20 being left therebetween sufficient to allow loading and unloading of the trays, as will be hereinafter pointed out.

Inside of the oven chamber is positioned a conveyor-member 21 which, as shown, is of the single-lap type and passes over a series of sprocket wheels 22 positioned appropriately in the oven chamber, and one of which is driven by any suitable means, so that the conveyor moving in the direction of the arrows traverses substantially the entire length of the chamber 10 and leg 18 passing upwardly past the opening 20 rearwardly along the top portion of the chamber 10, and thence forwardly along the lower portion of said chamber.

The heating of the oven chamber may be accomplished in any desired manner, but it has been found advantageous to provide heat by means of a double series of heating units 23 and 24, positioned substantially as shown, and in order that the conditions within the oven chamber may be more carefully controlled there is preferably provided a baffle 25 having a horizontal portion 26 substantially medially dividing the chamber 10, and a downwardly-extending leg 27 similarly dividing the chamber 18.

As shown in Fig. 5, the conveyor 21 is provided with means such as recesses 28, within which corresponding lugs 29 on the tray-members 30 may be removably positioned. These tray-members 30 may be of any desired structure, such as, for example, multiple pan trays. As will be readily understood, the loaded trays containing the dough-units are placed onto the conveyor through the opening 20 and, after traversing the baking chamber, the baked loaves are removed at the same opening.

In order that the conditions in the oven may be properly controlled for baking different types of dough stuffs, or for varying the conditions during the baking of any particular type of goods, there is provided near one wall of the oven a gas and vapor outlet communicating with the oven at substantially the top thereof and an interposed baffle-plate or curtain; and there is also provided near a second wall of the oven, preferably a wall opposite the first wall, a second gas and vapor outlet communicating with the oven at substantially the top thereof. By means of these baffle-plates or curtains the thickness of the layer of gas and vapor in the oven and the passage of the gas and vapor to said outlets is controlled. The two outlets coact to remove the excess gases without producing in any one part of the oven a large pressure gradient. It is important to obviate this as the pressure gradient gives rise to a temperature gradient (due to the cooling effect of gas expansion) which in time sets up drafts of changing temperature. Uniform constant temperature during any one portion of the baking period is essential for the production of goods of predetermined quality; it being well known to those skilled in the art that drafts within an oven are to be avoided.

Figure 2:
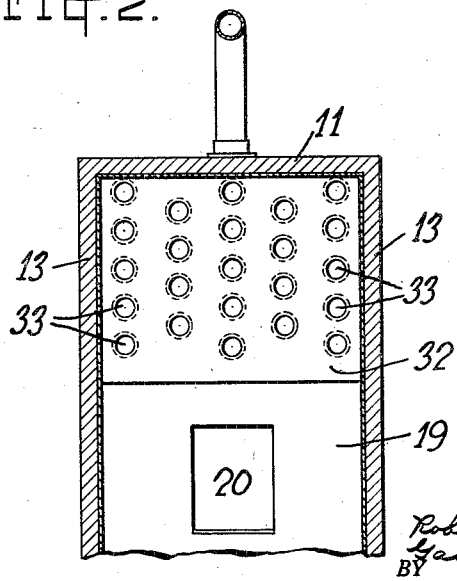
Fig. 2 is a detail view of the baffle-plate structure of said embodiment taken along the dotted line 2—2 of Fig. 1, looking in the direction of the arrows.

There may be any number of outlets and baffle-plates. For example, as is shown in Figs. 1 and 2, there are provided openings 31 and interposed baffle-plates 32, said baffle-plates being formed with a plurality of openings 33 which are controlled by any suitable means, such as the adjustable damper member 34; it being understood that when all of said damper members are in closed position the entire oven chamber will be filled with gas and vapor, any excess thereof passing downwardly under the edge of the baffle-plates 32 and upwardly through the openings 31; and that by selectively opening one or more of said damper members the vapor may be allowed to escape through said baffle-plate at any desired level whereby, if desired, a relatively dry atmosphere may be maintained in the oven either below the baffle 26 or throughout the chamber 10.

Another form of baffle plate which may be used is shown in Figs. 3 and 4, in which a solid baffle plate 35 is movable bodily upwardly and downwardly by means such as the cogs 36 and rack 37 whereby the position of the lower edge of the baffle will control the vapor level in the oven chamber. Also, as will be obvious, a combination of the two forms of baffle-plates may be used, if desired. This modified form of baffle may be used anywhere in the oven when there is an outlet for gases.

The openings 31 may be connected to any means adapted to effect withdrawal of the gases. It is preferred, however, to connect them to a condenser 38, which may be installed in any convenient position, for example at the side of the oven, as shown in Fig. 1. The amount of condensing water used is preferably such that a slight pressure will be maintained in the oven. A device for discharging the incondensable gases such as a fan may be attached to the condenser in order that the condensable gases will be withdrawn at a rate adapted to maintain nearly a static balance between the oven and the condenser.

Although for purposes of simplicity only a single-lap oven of the traveling chain type has been shown in the illustrations herein, it is to be understood that certain of the features of the present invention may, if desired, be applied to other types of ovens, such as, for example, to a multiple-lap oven, or to a traveling-plate oven of the turned type. If the length of the oven is sufficient, a leg similar to the leg at the front end of the oven may also be provided at the rear end of the oven whereby the dough-units may be fed into both ends of a chain-type oven, or by using mechanical loading and unloading devices, the principles of the present invention may be utilized in connection with a traveling plate oven. In either case, the baked loaves may be removed after one traverse of the chamber 10. In such event, the oven is further distinguished from the ordinary type of traveling oven in that because of the downwardly-projecting legs any tendency toward draft through the oven is minimized.

It will thus be appreciated that by means of the present invention there has been provided an oven in which the atmosphere throughout or in any portion thereof may be controlled at will, it being possible either to seal in all of the steam and gases, or these gases and vapors or any portion thereof may be eliminated entirely.

Since certain changes may be made in the above construction and different embodiments of the invention could be made, without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described our invention, what we claim as new and desire to secure by Letters Patent is:

1. In a traveling oven, in combination, a substantially horizontally-disposed baking chamber having a depending leg at one end thereof, a loading opening communicating with said depending leg and disposed below the level of the horizontal portion of the baking chamber, two gas and vapor outlets communicating with said horizontal portion of the baking chamber, one positioned adjacent the end having the depending leg, the other adjacent the opposite end, and baffle means adapted to be variably interposed between said horizontal portion and said gas outlets; said baffle means being adjustable to control the depth of the gas and vapor atmosphere therein during baking.

2. In a traveling oven, in combination, a substantially horizontally-disposed baking chamber having a depending leg at one end thereof, a loading opening communicating with said depending leg and disposed below the level of the horizontal portion of the baking chamber, two gas and vapor outlets communicating with said horizontal portion of the baking chamber, one positioned adjacent the end having the depending leg, the other adjacent the opposite end, and baffle means adapted to be variably interposed between said horizontal portion and said gas outlet; said baffle means being adapted to be raised and lowered vertically to control the depth of the gas and vapor atmosphere therein during baking.

3. In a traveling oven, in combination, a substantially horizontally-disposed baking chamber having a depending leg at one end thereof, a loading opening communicating with said depending leg and below the level of the horizontal portion of the baking chamber, two gas and vapor outlets communicating with said horizontal portion of the baking chamber, one positioned adjacent the end having the depending leg, the other adjacent the opposite end, and baffle plates interposed between said horizontal portion and said gas outlets; said baffle plates having a series of openings therethrough, and means for selectively closing said openings.

4. In a traveling chain oven, in combination, a substantially horizontally-disposed baking chamber having a depending leg at one end thereof, a loading opening communicating with said depending leg and disposed below the level of the horizontal portion of the baking chamber, a baffle horizontally disposed and dividing said horizontal portion substantially medially, a series of heating elements disposed over said baffle, a second series of heating elements disposed along the bottom of said horizontal portion, an endess chain conveyor mounted to carry dough-pans over each series of heating units and downwardly past said loading opening, two gas outlets communicating with said horizontal portion of the baking chamber, one positioned adjacent the end having the depending leg, the other adjacent the opposite end, and baffle means adapted to be variably interposed between said horizontal portion and said gas outlets; said baffle means being adjustable to control the depth of the gas and vapor atmosphere therein during baking.

In testimony whereof we affix our signatures.

ROBERT L. CORBY.
GABE R. FENNEMA.